(12) United States Patent
Mayer et al.

(10) Patent No.: US 11,423,566 B2
(45) Date of Patent: Aug. 23, 2022

(54) VARIABLE MEASURING OBJECT DEPENDENT CAMERA SETUP AND CALIBRATION THEREOF

(71) Applicant: Carl Zeiss Industrielle Messtechnik GmbH, Oberkochen (DE)

(72) Inventors: Thomas Mayer, Kolbermoor (DE); Heiko Goller, Obersulm (DE); Nils Haverkamp, Aalen (DE); Andrzej Grzesiak, Oberkochen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 257 days.

(21) Appl. No.: 16/690,009

(22) Filed: Nov. 20, 2019

(65) Prior Publication Data
US 2020/0160555 A1   May 21, 2020

(30) Foreign Application Priority Data

Nov. 20, 2018   (DE) .................... 10 2018 129 143.4

(51) Int. Cl.
*G06T 7/73* (2017.01)
*G06T 7/80* (2017.01)
*H04N 5/247* (2006.01)

(52) U.S. Cl.
CPC .............. *G06T 7/73* (2017.01); *G06T 7/80* (2017.01); *H04N 5/247* (2013.01); *G06T 2207/30212* (2013.01)

(58) Field of Classification Search
CPC ... G06T 7/73; G06T 7/80; G06T 2207/30212; G06T 2207/30204; H04N 5/247

USPC ......................................................... 382/103
See application file for complete search history.

(56) References Cited

U.S. PATENT DOCUMENTS

| | | | |
|---|---|---|---|
| 2,021,034 A * | 11/1935 | Thompson | H01J 40/14 361/175 |
| 5,285,397 A | 2/1994 | Heier et al. | |
| 6,973,202 B2 * | 12/2005 | Mostafavi | A61B 6/463 382/103 |
| 9,934,592 B1 | 4/2018 | Bodjanski et al. | |
| 10,783,659 B1 * | 9/2020 | Hull | G01B 11/002 |
| 2006/0268285 A1 * | 11/2006 | Karabassi | G01B 11/2504 356/601 |

(Continued)

FOREIGN PATENT DOCUMENTS

| | | | | |
|---|---|---|---|---|
| DE | 3941144 A1 | | 6/1991 | |
| DE | 10048097 A1 | | 4/2002 | |
| JP | 2009168626 | * | 7/2009 | G01B 11/00 |

*Primary Examiner* — Jerome Grant, II
(74) *Attorney, Agent, or Firm* — Falk Ewers; Ewers IP Law PLLC

(57) ABSTRACT

A method and a system for determining a 6-DOF-pose of an object in space use at least one marker attached to the object and a plurality of cameras. Perspectives of the cameras are directed to a common measuring space in which the object is positioned. At least one camera from the plurality of cameras is movable such that the movable camera can be adjusted with respect to the object. At least one of the cameras captures an image of said marker attached to the object. Based on the at least one captured image, spatial parameters representing the 3D-position or the 6-DOF-pose of the marker and, consequently, the 6-DOF-pose of the object in space can be determined.

21 Claims, 9 Drawing Sheets

(56) References Cited

U.S. PATENT DOCUMENTS

| | | | | |
|---|---|---|---|---|
| 2007/0247615 A1* | 10/2007 | Bridges | ............... | G01S 5/163 |
| | | | | 356/139.03 |
| 2009/0096783 A1* | 4/2009 | Shpunt | ............... | G06T 7/557 |
| | | | | 345/419 |
| 2012/0296601 A1* | 11/2012 | Eatwell | ............... | G01P 15/14 |
| | | | | 702/141 |
| 2017/0208292 A1* | 7/2017 | Smits | ............... | G01S 3/00 |
| 2019/0378299 A1* | 12/2019 | Tokura | ............... | G06T 7/174 |
| 2020/0160555 A1* | 5/2020 | Mayer | ............... | G06T 7/73 |
| 2020/0206938 A1* | 7/2020 | Mase | ............... | B25J 9/0081 |
| 2020/0292706 A1* | 9/2020 | Hexsel | ............... | G01S 7/4808 |
| 2021/0056306 A1* | 2/2021 | Hu | ............... | G06K 9/00832 |
| 2021/0333384 A1* | 10/2021 | Yamazaki | ............... | G01S 13/426 |

\* cited by examiner

VARIABLE MEASURING OBJECT DEPENDENT CAMERA SETUP AND CALIBRATION THEREOF

CROSS REFERENCE TO RELATED APPLICATIONS

This application claims priority to German patent application 10 2018 129 143.4, filed on Nov. 20, 2018, the entire content of which is incorporated herein by reference.

TECHNICAL FIELD

The present disclosure relates to a method and a system for determining a 6-DOF-pose of an object in space. More particularly, the disclosure relates to a method and a system which employ at least one marker. The at least one marker is attached to the object and images of the marker are captured. Using image processing technologies, the 6-DOF-pose of the object in space can be determined based on an analysis of the captured images of the marker.

BACKGROUND

Determining both 3D-position and 3D-orientation of an object in space requires determining at least 6 parameters which represent 6 degrees of freedom (DOF), namely 3 parameters representing the 3D-position along the three axes of a 3D coordinate system and 3 further parameters representing angular orientation about any of the three axes. Typically, the 3D coordinate system is defined relative to at least one camera or relative to a reference object in space by using appropriate calibration. The 6-DOF-pose includes both the 3D position and the 3D orientation relative to the coordinate system.

The 3D-position of markers in space can be determined through photogrammetric methods by using one or more calibrated cameras. For instance, the markers to be measured can be passive or active markers that are configured in such a way that the 3D-position of the center of the respective marker can be determined. Passive markers are typically characterized by their particular shape, pattern and/or material. Exemplarily, a passive marker can be a circular marker made of adhesive film that has a black edge and a bright center. Active markers can be for example light-emitting diodes (LEDs).

During an exemplarily photogrammetric measuring process the markers that are visible for the cameras in a common measuring space are captured by the cameras from different perspectives. For determining of the 3D-position of the markers in space from the captured images, each visible marker is initially detected in each captured image of the cameras and the respective image position of each marker within the respective captured image is photogrammetrically measured in pixel coordinates. In further determination steps, the 3D-position of the markers in space is determined based on the calculated image position. In particular, the 3D-position of the markers in space is determined by bundle block compensation and forward cutting calculation. The results of the measurement are the 3D-positions of the markers in space.

In various applications, the markers are attached to objects for determining the 6-DOF-pose of the objects. Typically, the 3D-position of at least three attached makers is necessary for determining the 6-DOF-pose of the objects.

However, general photogrammetric measuring processes are not limited to calculating 3D-positions of markers in space. Markers which include a 2D-pattern enable determining the 6-DOF-poses of these markers in space through photogrammetric methods by using one or more calibrated cameras.

For instance, U.S. Pat. No. 9,934,592 B1 describes an exemplary method and system for determining a 6-DOF-pose of an object in space by using at least one 2D optical-tracking marker. The at least one 2D optical-tracking marker is attached to an object. In case when a plurality of 2D optical-tracking markers are used, each 2D optical-tracking marker has a characteristic unique pattern so that the 2D optical-tracking markers can be unambiguously identified. This pattern also enables determination of the 6-DOF-pose of the 2D optical-tracking markers. At least one image of the at least one 2D optical-tracking marker is captured. Using image processing technologies, the 6-DOF-pose of the at least one 2D optical-tracking marker and, consequently, the 6-DOF-pose of the object in space can be determined.

In industrial applications, camera based measurement systems are sometimes designed in such a way that a plurality of cameras are installed at fixed positions around an object or around a measuring station for the object relative to a common measurement space of the plurality of cameras so that also complex shaped objects or objects with different sizes can be measured.

For instance, such objects can be optical 3D sensors such as laser scanner, fringe-projection sensors, and stereo-vision sensors. The markers can be attached to the optical 3D sensor within the common measuring space so that the measuring position and orientation of the 3D sensor representing the 6-DOF-pose of the sensor in space can be determined. This operation is commonly called "sensor-tracking". In the case when only the 3D-position of each marker is determinable, at least three attached markers are necessary for determining the 6-DOF-pose of the 3D sensor in space. In the other case the 6-DOF-pose of each marker is determinable by using 2D optical-tracking markers, at least one attached marker is sufficient for determining the 6-DOF-pose of the 3D sensor in space. Based on this information, the measuring data of the 3D sensor from different measuring locations of the 3D sensor can be transformed into a superordinate coordinate system so that the measuring data can be assembled to a common 3D data set. The operation of transforming the measuring data to a superordinate coordinate system is commonly called "global registration".

Further, document DE 101 37 241 A1 describes an apparatus and a method for detecting and measuring an object by registration of partial views of the object in a global coordinate system. Thereby, attaching registration markers for registration of each partial view of the object shall be avoided by an optical projection of the markers onto the surface of the object and by detection of the markers by localization cameras. Using processing technology, the partial views are registered to a global coordinate system based on the information on the detected markers. During the measuring process, the localization cameras can be adjusted in space, wherein an update of the calibration of the localization cameras is performed.

Generally in measurement applications, the object or the 3D sensor is positioned with attached markers within the field of view of the cameras or at least within a subset of the cameras. Thereby, it is favorable that the cameras have a suitable working distance from the object or the 3D sensor for achieving an accurate measuring result. In particular, the employed working distance and the focus region of the cameras should be adjusted to one another.

The known methods and systems still leave room for improvements, especially with respect to accuracy, flexibility, and costs of implementation.

SUMMARY

Against this background, it is an object to provide an improved method and an improved system for determining a 6-DOF-pose of an object in space with higher accuracy.

It is another object to provide an improved method and an improved system for determining a 6-DOF-pose of an object in space with more flexibility and in a cost-effective manner. In particular, it is an object to provide an improved method and an improved system for determining a 6-DOF-pose of an object in space with a minimum of cameras.

According to an aspect of the disclosure, there is provided a method for determining a 6-DOF-pose of an object in space, said 6-DOF-pose defining a 3D-position and a 3D-orientation of the object in space, the method including the steps of arranging a plurality of cameras at individual 6-DOF-poses in space, wherein each camera includes at its individual 6-DOF pose an individual perspective into the space, wherein the individual perspectives of the plurality of cameras together define a common measuring space (CMS), and wherein at least one camera from the plurality of the cameras is movable; attaching a marker assembly to the object; positioning the object with the marker assembly within the CMS; adjusting the CMS with respect to the object by moving the at least one movable camera, thereby changing the individual perspective of the at least one movable camera in space; capturing at least one respective image of said marker assembly attached to the object using the plurality of cameras; determining spatial parameters of the marker assembly based on the at least one captured image; and determining a 6-DOF-pose of the object in space based on the spatial parameters of the marker assembly, wherein the object is a measuring device that includes a 3D sensor for measuring a measuring object.

According to a further aspect of the disclosure, there is provided a method for determining a 6-DOF-pose of an object in space, said 6-DOF-pose defining a 3D-position and a 3D-orientation of the object in space, the method including the steps of arranging a plurality of cameras at individual 6-DOF-poses in space, wherein each camera includes at its individual 6-DOF pose an individual perspective into the space, wherein the individual perspectives of the plurality of cameras together define a common measuring space, CMS, and wherein at least one camera from the plurality of the cameras is movable; attaching a marker assembly to the object; positioning the object with the marker assembly within the CMS; adjusting the CMS with respect to the object by moving the at least one movable camera, thereby changing the individual perspective of the at least one movable camera in space; capturing at least one respective image of said marker assembly attached to the object using the plurality of cameras; determining spatial parameters of the marker assembly based on the at least one captured image; and determining a 6-DOF-pose of the object in space based on the spatial parameters of the marker assembly.

According to another aspect of the disclosure, there is provided a system for determining a 6-DOF-pose of an object in space, said 6-DOF-pose defining a 3D-position and a 3D-orientation of the object in space, the system including a plurality of cameras at individual 6-DOF-poses in space, wherein each camera includes at its individual 6-DOF pose an individual perspective into the space, wherein the individual perspectives of the plurality of cameras together define a common measuring space, CMS, and wherein at least one camera from the plurality of the cameras is movable; a marker assembly configured to be attached to the object, the object being positionable within the CMS; and a processing unit configured for executing steps of adjusting the CMS with respect to the object by moving the at least one movable camera, thereby changing the individual perspective of the at least one movable camera in space; capturing at least one respective image of said marker assembly attached to the object using the plurality of cameras; determining spatial parameters of the marker assembly based on the at least one captured image; and determining a 6-DOF-pose of the object in space based on the spatial parameters of the marker assembly.

Advantageously, the new method is implemented using a plurality of cameras and a processing unit, which may be a general purpose computer or a special purpose computer, where an appropriate computer program is stored and executed, said computer program being designed and configured for determining the 6-DOF-pose of the object in accordance with the aforementioned method.

As used herein, the term "perspective" describes a particular field of view at a particular position and orientation in space. Thus, each camera is arranged at a particular position and orientation in space and includes an individual field of view at this particular position and orientation in space.

The CMS is a partial space or subspace of the whole spatial environment where the new system is located. The perspectives of the cameras are directed to this subspace so that the subspace is covered by the individual fields of view of the cameras. In other words, the CMS is a subspace defined by the fields of view of the cameras. For instance, the subspace covered by the perspective of one camera is the space covered by the respective viewing cone of the camera. The viewing cone represents the boundary of the field of view. In particular, the viewing cone can also be a generalized cone. Mathematically, a "generalized cone" is the surface created by the set of lines passing through a vertex and every point on a boundary. Such a generalized cone may have an arbitrary base surface, such as a circle, a triangle, a rectangle, and the like.

Generally, at least six independent parameters that are related to structural characteristics of the object are necessary for determining the 6-DOF-pose of the object in space. Therefore, the marker assembly can carry information representing six independent spatial parameters which represent the 6-DOF-pose of the marker assembly in space. Therefore, the marker assembly can include structural characteristics which are related to these spatial parameters. Typically, the marker assembly can include structural characteristics which are related to six independent spatial parameters which are determined in the step of determining spatial parameters of the marker assembly.

For instance, such structural characteristics may be provided by one or more markers. One structural characteristic of the one or more markers may be the 3D-position of each marker in space, wherein the 3D-position of each marker in space is typically characterized by the 3D-position of the center of the respective marker. In case, if more than one marker is used, the spatial arrangement of the markers with respect to each other may provide further structural characteristics. Each marker may also have an individual structural characteristic such as a pattern, a color and the like that enables a unique identification of the respective marker. The one or more markers may also carry information on a spatial orientation of the one or more markers as further structural characteristics. Exemplarily, the information on a spatial orientation can be provided by markers having a 2D pattern and the like.

The spatial parameters are determined for determining the 6-DOF-pose of the object in space based on a spatial relation between the marker assembly and the object which arises from attaching the marker assembly to the object. By attaching the marker assembly to the object, the spatial arrangement of the marker assembly with respect to the object is set. In particular, the spatial arrangement of the marker assembly can be preset before attaching the marker assembly so that the marker assembly is attached to a preset location on the object. Alternatively, the spatial arrangement of the marker assembly can be determined after attaching the marker to the object, in particular wherein the location on the object to which the marker assembly is attached is determined. In both cases, the spatial arrangement with respect to the object can be represented by a mapping, in particular a transformation, which characterizes the spatial relation between the marker assembly and the object. In particular, the mapping can be configured such that the spatial independent parameters of the marker arrangement can be mapped to parameters representing the 6-DOF-pose of the object in space.

The flexibility of the provided method and system is improved as the CMS can be adjusted for different objects and different 6-DOF-poses of the object by changing the 6-DOF-pose of the at least one movable camera. In particular, when the object is movable, the CMS can be adjusted such that the object remains within the CMS. Therefore, the position of a movable object can be tracked.

Prior systems and methods generally therefore increase the number of cameras so that a bigger CMS can be covered by the plurality of cameras. However, the provided system and method therefore need less cameras to track the 6-DOF-pose of the object in space the same way. Thereby, also a cost reduction can be achieved.

Further, the CMS can be adjusted in such a way that the accuracy of the determination of the 6-DOF-pose of the object in space is increased. In particular, the at least one movable camera can be adjusted such that the accuracy of the determination of the spatial parameters from the captured image is increased.

In an exemplary embodiment of the disclosure, the marker assembly includes at least one 2D optical-tracking marker including a rotationally asymmetric pattern, wherein, in the step of determining the spatial parameters, the spatial parameters are a representation for the 6-DOF-pose of the at least one marker in space.

Mathematically, the term "rotationally symmetric" indicates with regard to an object that a rotation around an axis, the so called symmetry axis, maps the object to itself. A rotationally asymmetric pattern includes specific characteristics with respect to the orientation in space. Thus, a rotationally asymmetric pattern of a marker enables determining the 6-DOF-pose of the marker in space which provides six independent spatial parameters. To the contrary, a rotationally symmetric pattern does not include information on the orientation of the marker with respect to the symmetry axis. Therefore, a marker having a rotationally symmetric pattern does not enable determining six independent spatial parameters.

In a further exemplary embodiment, the marker assembly includes at least three substantially 1D markers or 2D optical-tracking markers including a rotationally symmetric pattern, wherein, in the step of determining the spatial parameters, the spatial parameters are a representation for the 3D-positions of the at least three markers in space.

A substantially 1D marker can be a point-shaped marker that has a small spatial extension that allows to detect the marker and to determine the position of the marker. In some exemplary embodiments, a 1D marker may be a point source, such as a LED and the like, or a point. Further, as already indicated above, a rotationally symmetric pattern does also not provide for all information on the orientation in space. Therefore, in this refinement, more than one marker is necessary for obtaining six independent spatial parameters of the marker assembly.

In a further exemplary embodiment, the at least one movable camera is translationally and/or rotationally movable so that the 3D-position and/or the 3D-orientation, in particular the 6-DOF-pose, of the at least one movable camera in space is changeable.

Thereby, the perspective of the at least one movable marker is changeable and, consequently, the CMS is changeable by changing the 3D-position and/or the 3D-orientation of the at least one movable camera. In some exemplary embodiments, the movable camera can be mounted to a rail along which the camera is translationally movable. In addition or as an alternative, the movable camera can be mounted to a joint, such as a ball joint, a swivel joint and the like, around which the camera is rotationally movable so that the orientation of the camera is changeable.

In a further exemplary embodiment, the plurality of cameras are mounted to a support structure, wherein the at least one movable camera is movable relative to the support structure.

The support structure supports the static cameras such that the static cameras can be mounted to the support structure with a fixed spatial relation. Further, the support structure supports the movable camera in such a way that the movable camera is movably mounted to the support structure. Thus, the spatial arrangement of the movable camera can be determined in relation to the support structure. Thereby, adjusting of the CMS is simplified. For instance, the support structure can be a frame, a plurality of support elements, and the like. In some exemplary embodiments, the movable camera can be mounted to the support structure by the aforementioned rail and/or joint so that the camera is translationally and/or rotationally movable.

In a further exemplary embodiment, the method further includes the step of calibrating the at least one movable camera.

In some exemplary embodiments, a calibration of the at least one movable camera after moving the camera may not be necessary when there is provided a mechanical actuation mechanism which enables an substantially exact positioning of the movable camera. However, when a mechanical actuation mechanism for moving the movable camera does not enable an exact positioning of the movable camera, a calibration of the at least one movable camera is favorable for achieving a higher accuracy of the determination results.

In a further exemplary embodiment, the method further includes the step of positioning at least one reference object in the CMS, and wherein the step of calibrating further includes determining the 6-DOF-pose of the at least one movable camera in space by using the reference object. Typically, the at least one reference object includes at least one reference marker.

This refinement provides a simple and efficient approach for calibrating the at least one movable camera. Typically, characteristics of the reference object, in particular of the at least one reference marker are known beforehand and relate to six independent spatial parameters. For calibrating the movable camera, six independent spatial parameters are favorable. In some exemplary embodiments, the reference marker is a 2D optical tracking marker having a rotationally asymmetric pattern. In some further exemplary embodiments, a plurality of reference marker are provided so that for the case that one or more reference markers are not visible to the movable camera there is still at least one or more other reference marker visible for the movable camera for performing the calibration. For instance, one or more reference marker may be covered by the object in a captured image of the movable camera.

In a further exemplary embodiment, in the step of positioning the object, the object is movable within a movement space, wherein the step of adjusting the CMS further includes changing the 6-DOF-pose of the at least one movable camera in space such that one or more markers of marker assembly are detectable by at least one of the plurality of cameras at each 6-DOF pose of the object in the movement space.

This refinement provides the advantage that the CMS covers the entire movement space so that the plurality of cameras are arranged such that the at least one marker is always visible within the CMS. Thus, a complete tracking of the 6-DOF-pose of the object in space is possible without adjusting the CMS a plurality of times. The adjusting step is only performed once when a new movement space is provided. Thereby, the measuring process can be accelerated.

In a further exemplary embodiment, the step of adjusting the CMS further includes changing the 6-DOF-pose of the at least one movable camera in space such that the detectability of one or more markers of the marker assembly is maximized for the plurality of cameras.

According to this exemplary embodiment, the accuracy of determining the spatial parameters from the image is increased as the detectability of the marker assembly within the captured image is maximized, and, consequently, the accuracy of the determination of the 6-DOF-pose of the object in space is increased.

In a further exemplary embodiment, the step of adjusting the CMS further includes changing the 6-DOF-pose of the at least one movable camera in space according to a measuring program.

A measuring program correlates the movement of the movable camera and the movement of the object so that poses of the movable camera can be preset and need not to be determined during the measuring process. Thereby, the measuring process can be accelerated.

In a further exemplary embodiment, the measuring program includes information on the movement of the object and corresponding information on the movement of the at least one movable camera. Typically, a target 6-DOF-pose of the at least one movable camera is set with respect to a corresponding 6-DOF-pose of the object.

In this exemplary embodiment, the information on the movement or the 6-DOF-poses of the object and the movable camera are brought into relation with each other. In some exemplary embodiments, the relation can be represented by a mapping or a table that sets a predefined sequence of movements or 6-DOF-poses of the object and the movable camera. Thereby, the measuring process can be further accelerated.

In a further exemplary embodiment, the measuring program sets target 6-DOF-poses of the at least one movable camera with respect to the object such that the detectability of one or more markers of the marker assembly is maximized.

As already indicated above, the accuracy of the determination of the 6-DOF-pose of the object in space is increased by maximizing the detectability of one or more markers of the marker assembly.

In a further exemplary embodiment, more than one of the cameras are movable, wherein the movable cameras are grouped in camera sets of at least two cameras, wherein each camera set is movable, wherein the relative 3D-positions or the relative 6-DOF-poses of the movable cameras within each camera set are constant.

This exemplary embodiment provides the advantage that the flexibility is increased as more than one movable camera is used. Further, as the camera sets are grouped in camera sets, the actuation mechanisms for movement of the camera sets can be simplified, because there need not to be provided an individual actuation mechanism for each of the movable cameras.

In a further exemplary embodiment, the step of capturing further includes that each of the cameras for which one or more markers of the marker assembly is detectable captures a respective image of said at least one or more markers attached to the object, wherein the step of determining spatial parameters further includes determining the spatial parameters based on the captured images.

According to this exemplary embodiment, the accuracy of the determination can be increased by analyzing more than one captured image.

In a further exemplary embodiment, the object is a measuring device that includes a 3D sensor for measuring a measuring object. Typically, the determined 6-DOF-pose of the measurement device is used for measuring characteristics of the measuring object, in particular a surface or particular measuring points of the measuring object.

As already indicated above, the present disclosure is applicable for tracking a measuring device in space. Generally, the data which are obtained from the 3D sensor do represent a measuring result with respect to the location of the measuring device in space. In order to create a model from the measuring object that samples measuring results taken from different locations of the measuring device, the measuring device can be registered to a superordinate coordinate system so that measuring results of the of the measuring device can be transformed to said superordinate coordinate system. By the present disclosure, the 6-DOF-pose of the measuring device in space is trackable so that the global registration can be performed.

It goes without saying that the features mentioned above and those yet to be explained below cannot only be used in the respective combinations disclosed, but also in different combinations or alone without departing from the scope of the present disclosure. Unless otherwise defined, all technical and scientific terms have the meaning as commonly understood by one of ordinary skill in the art.

BRIEF DESCRIPTION OF THE DRAWINGS

Further features and advantages will be apparent from the following detailed description. Unless otherwise defined, all technical and scientific terms have the meaning as commonly understood by one of ordinary skill in the art. In the drawings.

DESCRIPTION OF EXEMPLARY EMBODIMENTS

Figure 1:
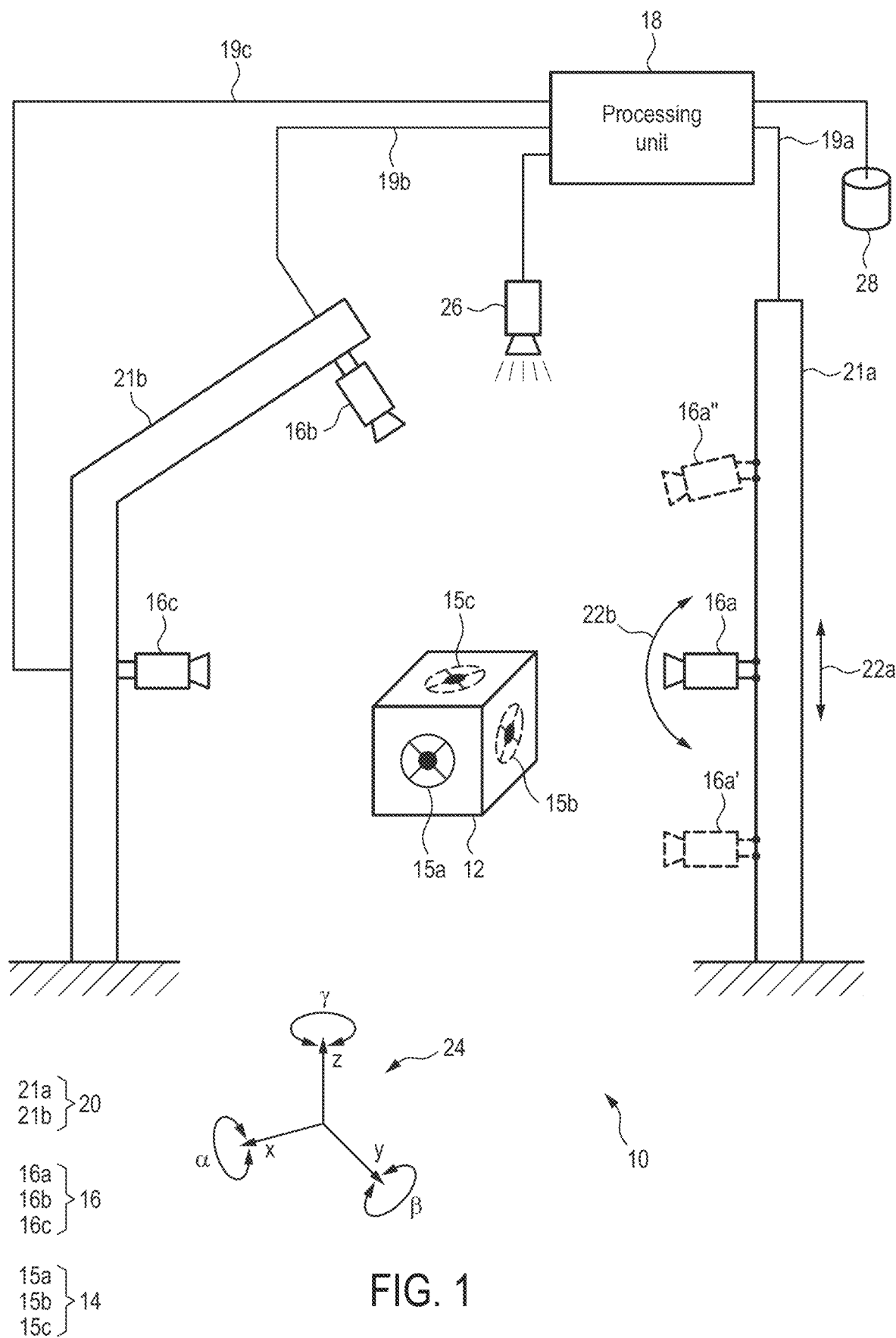
FIG. 1 shows a simplified schematic illustration of a system implementing a method according to a first exemplary embodiment of the disclosure.

In FIG. 1, an exemplary embodiment of the system is designated by reference number 10 in its entirety. System 10 is a measuring system that is designed and configured for determining a 6-DOF-pose of an object in space. System 10 may implement exemplary embodiments of the new method, as will be explained in the following.

In this exemplary embodiment, a marker assembly 14 is attached to the surface of the object 12. The marker assembly 14 can include one or more optical-tracking markers 15. In this exemplary embodiment, three markers 15a, 15b, and 15c are illustrated. In alternative exemplary embodiments, the marker assembly 14 can include more than three markers 15. In this exemplary embodiment, a first marker 15a is depicted in solid lines, while a second and a third marker 15b and 15c are depicted in dashed lines. The dashed lines denote that the second and the third marker 15b and 15c are optional.

In this exemplary embodiment, the system 10 includes a plurality of cameras 16. In particular, the system 10 includes three cameras 16. However, in alternative exemplary embodiments, there can be any number of cameras 16 that is at least two. In this exemplary embodiment, the system 10 includes a first camera 16a, a second camera 16b, and a third camera 16c. Generally, the cameras 16a, 16b, and 16c may be configured to capture greyscale images, color images, infrared images, or any useful combination thereof. The cameras 16a, 16b, and 16c are mounted to a support structure 20 in such a manner that the cameras 16a, 16b, and 16c are arranged at individual 6-DOF-poses in space. Thereby, each of the cameras 16a, 16b, and 16c includes an individual perspective. The individual perspectives are directed to a CMS. An exemplary embodiment of the CMS will be discussed below (see FIG. 2).

In this exemplary embodiment, a representation for the space can be given by a superordinate coordinate system 24 having x, y, and z-axes. A 6-DOF-pose in space is provided by a position within the superordinate coordinate system 24 given by x, y, and z-values and an orientation with respect to the x, y, and z-axes provided by corresponding rotation angles $\alpha$, $\beta$, and $\gamma$. Each of the cameras 16a, 16b, and 16c provides image information from its individual perspective at the individual 6-DOF-pose in space. This information may represent position and orientation of objects relative to the respective camera, exemplarily given by coordinates in a local coordinate system which refers to the respective camera. However, for determining the 6-DOF-pose in space, i.e., in the superordinate coordinate system 24, a global registration can be performed for each of the camera 16a, 16b, and 16c. The global registration can be achieved by a map that performs a rigid transformation from the local coordinate system of the respective camera to the superordinate coordinate system 24. For instance, the rigid transformation is represented by a transformation matrix and a translation vector that maps coordinates from the local coordinate system to the superordinate coordinate system. Exemplary embodiments of conducting a global registration will be explained below (see FIG. 5).

In this exemplary embodiment, the support structure 20 includes a first support element 21a and a second support element 21b. The second and the third camera 16b and 16c are mounted to the second support element 21b to fixed positions. The first camera 16a is movably mounted to the support element 21a. The support element 21a can include a rail and the camera 16a can be movable along the rail for translationally changing 22a the position of the first camera 16a in space. Further, the first camera 16a can be mounted to the support element 21a over a joint, in particular a swivel or ball joint, and the first camera 16a can be pivotable around the joint for rotationally changing 22b the orientation of the first camera 16a in space. Exemplarily, further 6-DOF-poses 16a' and 16a" of the first camera 16a are depicted with dashed lines. The 6-DOF-poses 16a' illustrates a state in which the first camera 16a has only been translationally moved along the support element 21a. The 6-DOF-poses 16a" illustrates a state in which the first camera 16a has been translationally moved along the support element 21a and the inclination of the first camera 16a has been adjusted.

In this exemplary embodiment, an actuation mechanism can be provided for actuating the movement of the first camera 16a. The actuation mechanism can include one or more actuation devices, such as drive motors and the like, for actuating the several rotationally and translationally movements of the first camera 16a. By moving the first camera 16a translationally and/or rotationally, the 3D-position and/or the 3D-orientation, in particular the 6-DOF-pose, of the at least one movable camera 16a in space is changeable.

The object 12 is positioned within the CMS. In other words, the object 12 is positioned in space such that at least one of the cameras 16a, 16b, and 16c is directed to the object 12 so that the object 12 is within the field of view of at least one of the cameras 16a, 16b, and 16c.

In this exemplary embodiment, the system 10 further includes a processing unit 18. The processing unit 18 is connected to the cameras 16a, 16b, and 16c via one or more lines 19. In this exemplary embodiment, the first camera 16a is connected to the processing unit 18 via a first line 19a, the second camera 16b is connected to the processing unit 18 via a second line 19b, and the third camera 16c is connected to the processing unit 18 via a third line 19c. It goes without saying that further cameras can also be connected to the processing unit 18, if appropriate. In general, the lines 19a, 19b, and 19c might be an electrical and/or optical cable. Additionally or as an alternative, the cameras 16a, 16b, and 16c might be connected to the processing unit 18 in a wireless manner.

The processing unit 18 is configured for controlling the cameras 16a, 16b, and 16c and for processing image data provided by the cameras. In particular, the processing unit 18 is designed and configured for determining the 6-DOF-pose of the object 12 in accordance with exemplary embodiments of the method explained further below. The processing unit 18 is further configured for controlling the rotationally and/or translationally movement of the first camera 16a. In particular, the processing unit 18 can be designed and configured for controlling a actuating mechanism which actuates movement of the first camera 16a. Therefore, the processing unit 18 can be configured for providing control signals to the actuating mechanism that include control commands for controlling the actuating mechanism.

Processing unit 18 may control illumination 30, which might include LED lamps or any other suitable generating light in the visible and/or infrared range. While illumination control by processing unit 28 is advantageous, other exemplary embodiments may be implemented without dedicated illumination control.

Processing unit 18 can be connected to or may include a non-transitory data memory 32 where a computer program is stored. In some exemplary embodiments, the processing unit 18 is a general purpose computer, such as a commercially available personal computer operating under Windows®, Linux or MacOS and the computer program from memory 32 includes program code designed and configured for implementing exemplary embodiments of the new method in combination with the marker assembly 14 and the cameras 16. In an alternative exemplary embodiment, the processing unit is logical circuit, such as a field programmable gate array (FPGA), an application-specific integrated circuit (ASIC), a microcontroller, or any other appropriate programmable electrical circuit. Therein, the exemplary embodiments of the new method, in particular controlling and determination steps, can be implemented within the logical circuit so that the logical circuit is designed and configured for implementing embodiments of the new method in combination with the marker assembly 14 and the cameras 16. For implementing exemplary embodiments of the new method in the logical circuit any appropriate programming language or hardware description language can be used, such as C, VHDL, and the like.

Figure 2:
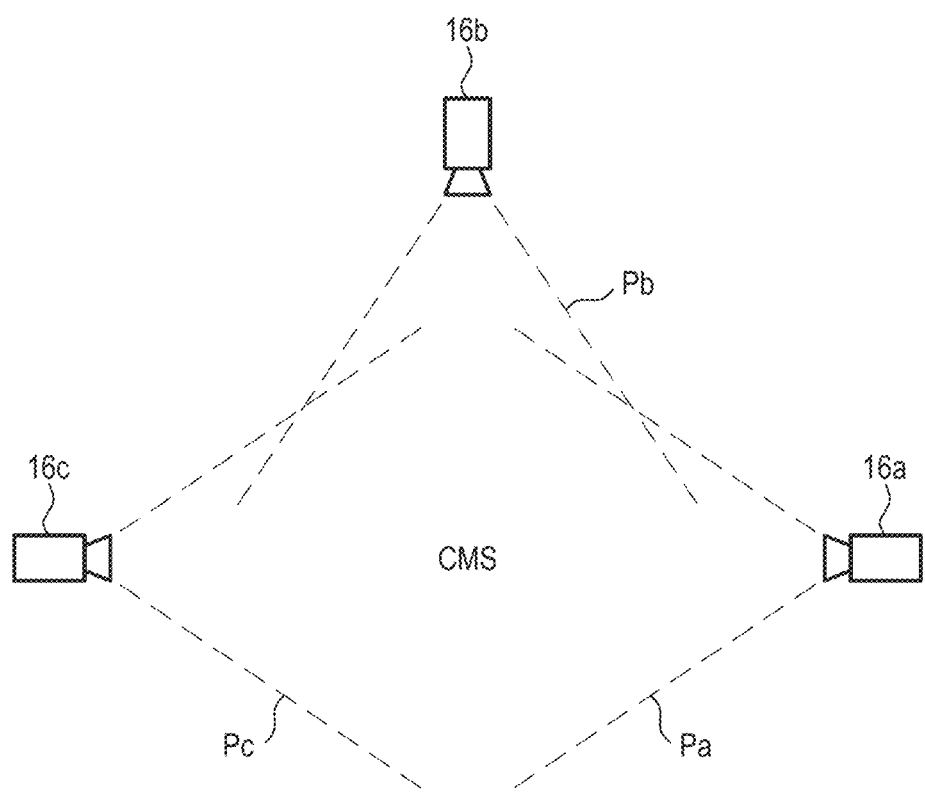
FIG. 2 shows a schematic illustration of a common measuring space which is used in the method and system shown in FIG. 1 according to an exemplary embodiment of the disclosure.

FIG. 2 shows an exemplary embodiment of the CMS shown in FIG. 1. Each of the cameras 16a, 16b, and 16c has an individual perspective Pa, Pb, and Pc. The field of view of each perspective Pa, Pb, and Pc covers a subspace in space. The sum of these subspaces is the CMS.

Figure 3:
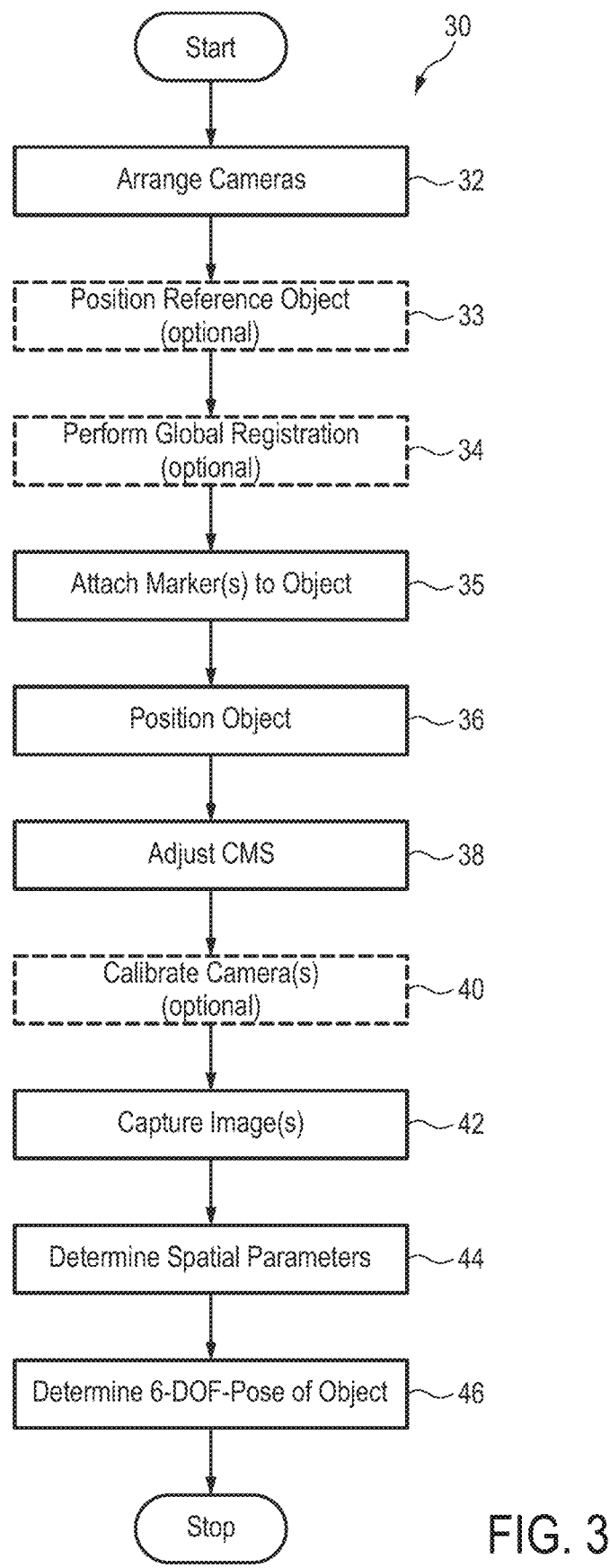
FIG. 3 shows a flow diagram for explaining the method according to an exemplary embodiment of the disclosure.

FIG. 3 shows an exemplary embodiment of the new method implemented by system 10 shown in FIG. 1. The new method is designated by reference number 30.

According to step 32, a plurality of cameras 16 is arranged at individual 6-DOF-poses in space as depicted in FIG. 1. Each of the cameras 16 includes an individual perspective P. The individual perspectives P are directed to a CMS. At least one of the cameras 16 is movable.

According to an optional step 33, at least one reference object is positioned in the CMS. Typically, the reference object includes at least one reference marker. Exemplary embodiments of a reference object will be explained below (see FIG. 5).

According to a further optional step 34, a global registration of each camera 16 is performed by using the reference object. Exemplary embodiments of a global registration will be explained below (see FIG. 5).

According to step 35, a marker assembly 14 is attached to the object 12. The marker assembly can be designed such as the marker assembly 14 depicted in FIG. 1.

According to step 36, the object 12 is positioned with the marker assembly 14 within the CMS. Thus, the marker assembly 14 is detectable for at least one of the cameras 16. Typically, the object 12 is movable within a movement space.

According to step 38, the CMS is adjusted with respect to the object 12 by changing the 6-DOF-pose of the at least one movable camera 16a in space. Typically, the adjusting is performed by an actuating mechanism which has been already described above (see FIG. 1).

In one exemplary embodiment, the step 38 further includes that the 6-DOF-pose of the at least one movable camera 16a in space is changed such that one or more markers 15 of marker assembly 14 are detectable by at least one of the plurality of cameras 16 at each 6-DOF pose of the object 12 in the movement space.

In a further exemplary embodiment, the step 38 further includes that the 6-DOF-pose of the at least one movable camera 16a in space is changed such that the detectability of one or more markers 15 of the marker assembly 14 is maximized for the plurality of cameras 16.

In a further exemplary embodiment, the step 38 further includes that the 6-DOF-pose of the at least one movable camera 16a is changed according to a measuring program. Exemplary embodiments of a measuring program will be explained below (see FIG. 7). Typically, the measuring program includes information on the movement of the object 12 and corresponding information 64 on the movement of the at least one movable camera 16a. Typically, a target 6-DOF-pose of the at least one movable camera 16a is set with respect to a corresponding 6-DOF-pose of the object 12. Typically, the measuring program sets target 6-DOF-poses of the at least one movable camera 16a with respect to the object 12 such that the detectability of one or more markers 15 of the marker assembly 14 is maximized.

According to an optional step 40, the at least one movable camera 16a is calibrated. Typically, the 6-DOF-pose of the at least one movable camera 16a in space is determined by using a reference object which is arranged in the CMS. Typically, the reference object includes at least one reference marker. Exemplary embodiments of calibrating the movable camera 16a will be explained below (see FIG. 5).

According to step 42, a respective image of said marker assembly 14 attached to the object 12 is captured by at least one of the cameras 16.

According to step 44, spatial parameters of the marker assembly 14 are determined based on the captured image. In the following, details of the step 44 will be briefly discussed.

The step 44 may include the following sub-steps: analyzing the captured image; detecting the 2D projection of at least one marker of the marker assembly; determining characteristics of the marker, such as size, inclination, location within the image, pattern, and the like; calculating local spatial parameters which represent the 6-DOF-pose of the marker assembly in the local coordinate system of the camera; and transforming the spatial parameters to the superordinate coordinate system 24 using the predetermined rigid transformation so that spatial parameters are determined in the superordinate coordinate system.

In one exemplary embodiment, when the marker assembly 14 includes at least one 2D optical-tracking marker including a rotationally asymmetric pattern (see FIG. 4A), the spatial parameters of the marker assembly are a representation for the 6-DOF-pose of the at least one marker in space.

In an alternative exemplary embodiment, when the marker assembly 14 includes either at least three 2D optical-tracking markers including a rotationally symmetric pattern (see FIG. 4B) or at least three 1D markers (see FIG. 4C), the spatial parameters are a representation for the 3D-positions of the at least three markers in space.

According to step 46, a 6-DOF-pose of the object 12 in space is determined based on the spatial parameters of the marker assembly 14. Thereby, the spatial relation between the object and the marker assembly is used. Typically, as indicated above, the spatial arrangement of the marker assembly with respect to the object is predefined or predetermined.

An exemplary embodiment of the steps 42 to 46 is provided in the document U.S. Pat. No. 9,934,592 B1 in detail.

Figure 4A:
FIG. 4A shows a marker which can be used in the method and system shown in FIG. 1 according to a first exemplary embodiment of the disclosure.
Figure 4B:
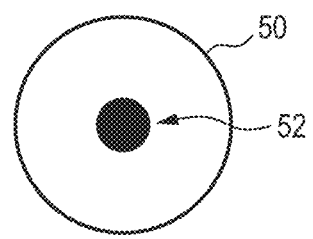
FIG. 4B shows a marker which can be used in the method and system shown in FIG. 1 according to a second exemplary embodiment of the disclosure.
Figure 4C:
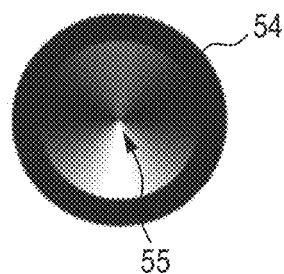
FIG. 4C shows a marker which can be used in the method and system shown in FIG. 1 according to a third exemplary embodiment of the disclosure.

FIGS. 4A to 4C show three different exemplary embodiments of markers for the marker assembly as shown in FIG. 1.

In a first exemplary embodiment shown in FIG. 4A, a marker 48 is shown that is a 1D optical-tracking marker. For instance, such a marker might be an active marker such as an LED or the like. Within a captured image, the marker 48 appears as a point at a particular location having a particular brightness, which corresponds to the distance of the marker. In other words, such a marker can provide three independent spatial parameters which correspond to the 3D-position in space. For obtaining six independent parameters which can represent the 6-DOF-pose of a marker assembly, at least three 1D optical-tracking marker of this kind are necessary.

In a second exemplary embodiment shown in FIG. 4B, a marker 50 is shown that is a 2D optical-tracking marker. The marker 50 has a circular contour and includes a rotationally asymmetric pattern 52. The pattern 52 has an intensity profile that is constant along a circular path around a circle center point. Within a captured image, the marker 50 appears as an ellipse which is a 2D projection of the circular shape of the marker 50. The 3D-position can be obtained from the size and the location of the center of the ellipse. The orientation of the ellipse with respect to two axes in space can be obtained from the eccentricity of the ellipse. However, as the marker 50 is rotationally symmetric, the orientation with respect to the symmetric axis cannot be obtained so that only five independent spatial parameters can be obtained from the marker 50. For obtaining six independent spatial parameters which can represent the 6-DOF-pose of a marker assembly, at least three 2D optical-tracking marker of this kind are necessary.

In a third exemplary embodiment shown in FIG. 4C, a marker 54 is shown that is a 2D optical-tracking marker. The marker 54 has a circular contour and includes a rotationally asymmetric pattern 55. The pattern 55 has an intensity profile that varies substantially continuously along a circular path around a circle center point. Accordingly, the marker pattern 55 may be perceived as analog or almost analog, although marker pattern 55 may be produced from a plurality of dots or pixels. Within a captured image, the marker 50 appears as an ellipse which is a 2D projection of the circular shape of the marker 50. The 3D-position can be obtained from the size and the location of the center of the ellipse. The orientation of the ellipse with respect to two axes in space can be obtained from the eccentricity of the ellipse. From the varying intensity profile, the orientation with respect to an axis perpendicular to the marker can be obtained. Therefore, six independent spatial parameters can be obtained from the marker 54. For obtaining six independent spatial parameters which can represent the 6-DOF-pose of a marker assembly, at least one 2D optical-tracking marker of this kind is necessary.

Figure 5:
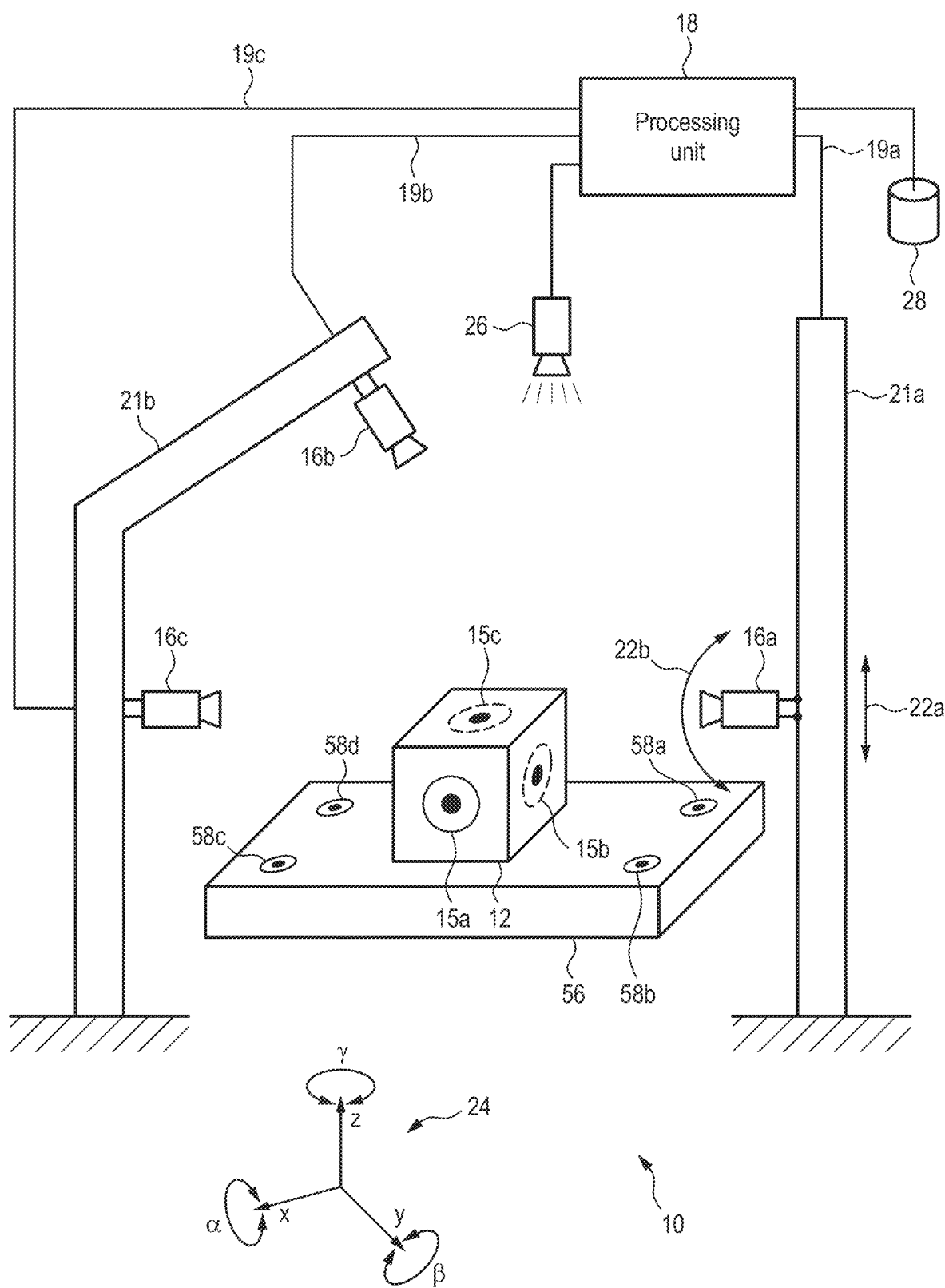
FIG. 5 shows a schematic illustration of a system implementing the method according to a second exemplary embodiment of the disclosure.

FIG. 5 shows a schematic illustration of a second exemplary embodiment of a system implementing the method. In FIG. 5, the same system 10 is depicted as shown in FIG. 1.

Additionally, FIG. 5 shows a reference object 56 that is arranged within the CMS for calibrating one or more of the cameras 16. The reference object 56 includes four reference markers 58a to 58d which are attached to the reference object 56. The number of reference markers is arbitrarily selected in this exemplary embodiment. Any other number of reference markers can be chosen that enables a calibration of the cameras 16. Typically, the reference object 56 is arranged within the CMS such that each camera 16 can detect a sufficient number of reference markers for determining six independent spatial parameters of the reference object 56. In particular, six independent spatial parameters may be necessary for calibrating a camera.

Figure 6:
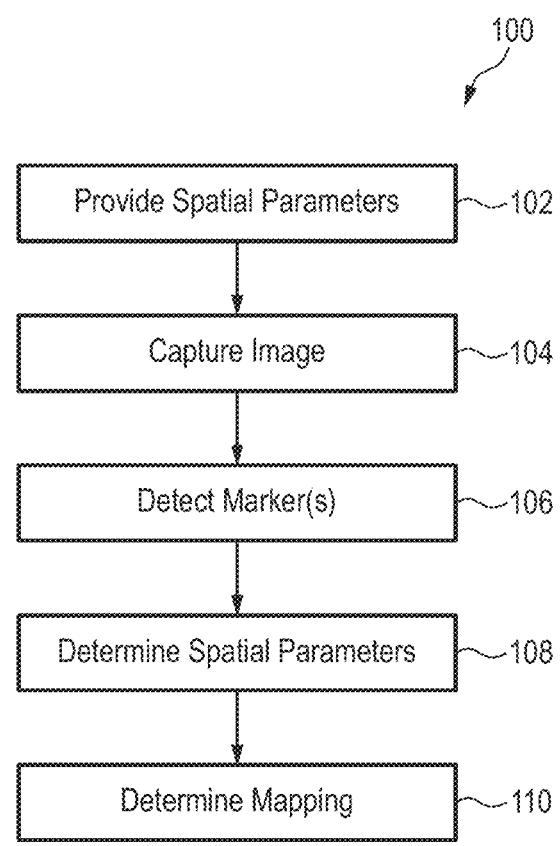
FIG. 6 shows a method for calibrating a camera according to an exemplary embodiment of the disclosure.

FIG. 6 shows an exemplary embodiment of a method for calibrating a camera. The method for calibrating the camera is designated by reference number 100.

Generally, calibration 100 of a camera is performed by registration of the camera to a global or superordinate coordinate system. In an exemplary embodiment, calibration 100 of a camera includes the following steps.

In step 102, six independent spatial parameters of one or more reference markers that represent the 6-DOF-pose of the reference object in space are provided in the superordinate coordinate system.

In step 104, an image is captured by said camera. Typically, the captured image includes at least one of the reference markers.

In step 106, the at least one reference marker is detected in the captured image.

In step 108, spatial parameters of the at least one reference marker that correspond to the spatial parameters provided in the superordinate coordinate system are determined in a local coordinate system of said camera.

In step 110, a mapping is determined that maps the spatial parameters in the local coordinate system to the corresponding spatial parameters in the global coordinate system. In other words, the determined mapping maps the view of said camera to the superordinate coordinate system. The mapping can include a rigid transformation represented by a transformation matrix and/or a translation vector.

The above described calibration of a camera can be used for calibrating the at least one movable camera 16a after the 6-DOF-pose of the movable camera 16a has been changed for adjusting the CMS.

Alternatively or additionally, the above described calibration of a camera can be used for conducting a global registration of the plurality of cameras by performing a calibration of each camera to the superordinate coordinate system.

Figure 7:
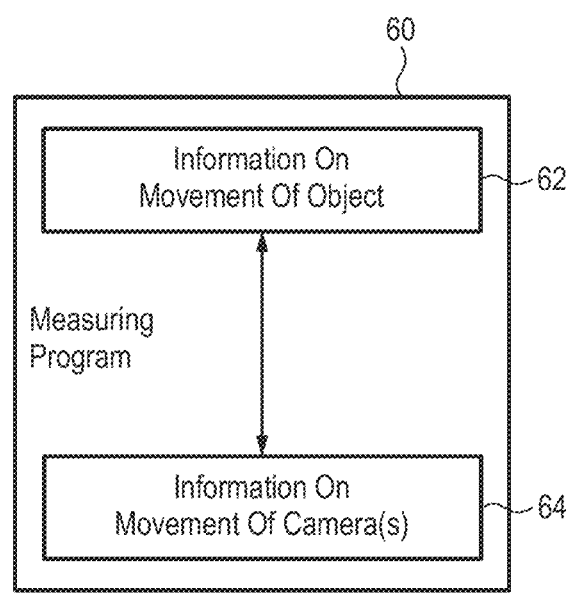
FIG. 7 shows a block diagram of a measuring program which can be used in the method and system shown in FIG. 1 according to an exemplary embodiment of the disclosure.

FIG. 7 shows a block diagram of an exemplary embodiment of a measuring program which can be used in the system of FIG. 1 implementing the method shown in FIG. 3. The measuring program is used for controlling the at least one movable camera 16*a*. The measuring program is depicted with the reference numeral 60.

The processing unit 18 can be configured to control the movement of the object 12 and the movement of the at least one movable camera according to the measuring program 60. A detailed exemplary embodiment therefore is provided in FIG. 9.

Generally, the measuring program 60 provides a mapping of first information 62 on the movement of the object 12 with second information 64 on the movement of the at least one movable camera. Exemplarily, the mapping can be represented by a function or a table that provide a relationship between the movement of the object and the movement of the camera with respect to a time parameter. Alternatively, the mapping can be represented by a function or a table that provide a relationship between 6-DOF-poses of the object and 6-DOF-poses of the one or more movable cameras so that a trajectory of the object is mapped to a trajectory of the one or more movable cameras.

In both cases, the processing unit 18 is configured to change the 6-DOF-pose of the at least one movable camera to a target 6-DOF-pose of the at least one movable camera. Typically, the processing unit 18 can then be configured to perform a global registration using the target 6-DOF-pose of the at least one movable camera. Alternatively, a calibration of the movable camera according to the exemplary embodiment shown in FIGS. 5 and 6 can be performed for each target 6-DOF-pose of the camera to determine the actual 6-DOF-pose of the camera.

The measuring program 60 can be designed such that the target 6-DOF-poses of the at least one movable camera are set with respect to the object 12 such that the detectability of the markers 15 of the marker assembly 14 is maximized.

In one exemplary embodiment, one camera 16*a* is movable so that the measuring program 60 provides a mapping of information on the movement of the object with information on the movement of the movable camera 16*a*.

An example of a table representing the measuring program 60 is provided in table 1 below. Therein, table 1 provides a mapping of target 6-DOF-poses of the object 12 and target 6-DOF-poses of the movable camera 16*a*. The target 6-DOF-poses of the object 12 and the camera 16*a* are provided in coordinates (x, y, z, $\alpha$, $\beta$, and $\gamma$) with respect to the superordinate coordinate system 24. The sequence of said target 6-DOF-poses forms a trajectory for the object 12 and the movable camera 16*a*.

TABLE 1

| target 6-DOF-pose of object ($x_o$, $y_o$, $z_o$, $\alpha_o$, $\beta_o$, $\gamma_o$) | target 6-DOF-pose of movable camera ($x_c$, $y_c$, $z_c$, $\alpha_c$, $\beta_c$, $\gamma_c$) |
|---|---|
| (0, 0, 0, 0°, 0°, 0°) | (0, 10, 0, 0°, 0°, 0°) |
| (1, 0, 0, 0°, 0°, 0°) | (1, 10, 0, 0°, 0°, 0°) |
| (1, 1, 0, 0°, 0°, 0°) | (1, 11, 0, 0°, 0°, 0°) |
| (1, 1, 0, 10°, 0°, 0°) | (1, 10, 1, −10°, 0°, 0°) |
| . . . | . . . |

An alternative example of a table representing the measuring program 60 is provided in table 2 below. Therein, table 2 provides a mapping of the translation and rotation of the object 12 and the camera 16*a* with respect to the superordinate coordinate system. In this case, also the starting 6-DOF-poses of the object and the camera should be provided in the superordinate coordinate system 24. For instance, the starting 6-DOF-poses of the object 12 is (0, 0, 0, 0°, 0°, 0°) and the starting 6-DOF-poses of the camera 16*a* is (0, 10, 0, 0°, 0°, 0°).

TABLE 2

| Translation and Rotation of Object ($x_o$, $y_o$, $z_o$, $\alpha_o$, $\beta_o$, $\gamma_o$) | Translation and Rotation of movable camera ($x_c$, $y_c$, $z_c$, $\alpha_c$, $\beta_c$, $\gamma_c$) |
|---|---|
| (0, 10, 0, 0°, 0°, 0°) | (0, 10, 0, 0°, 0°, 0°) |
| (1, 0, 1, 0°, 0°, 0°) | (1, 0, 1, 0°, 0°, 0°) |
| (0, 0, 0, 0°, 0°, −90°) | (10, −10, 0, 0°, 0°, 90°) |
| (10, 0, 0, 10°, 0°, 0°) | (10, 0, 0, 10°, 0°, 0°) |
| . . . | . . . |

Figure 8:
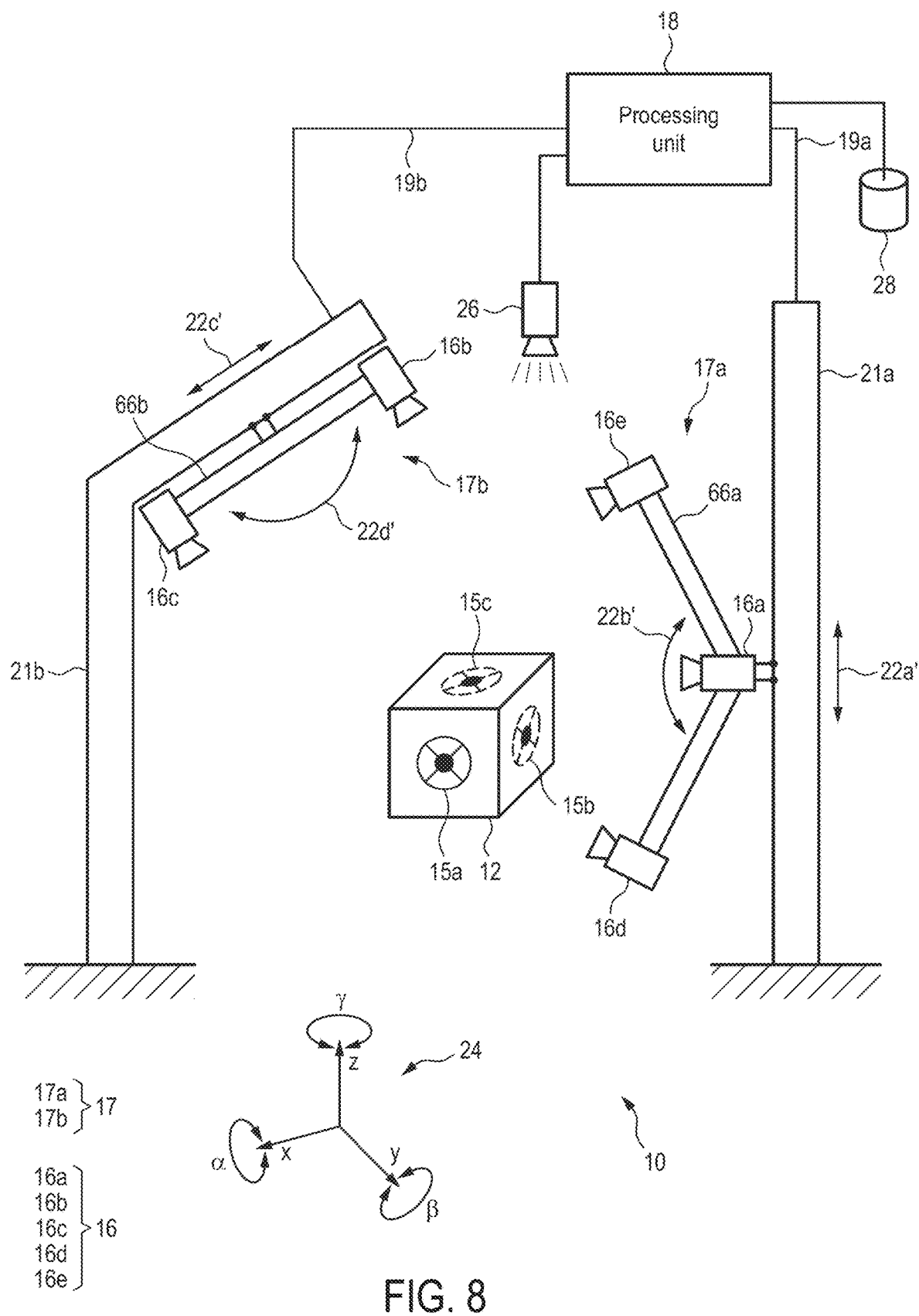
FIG. 8 shows a schematic illustration of a system implementing the method according to a third exemplary embodiment of the disclosure.

FIG. 8 shows a schematic illustration of a third exemplary embodiment of the system shown in FIG. 1 implementing the method shown in FIG. 3. The depicted system corresponds to the system shown in FIG. 1 and differs from FIG. 1 in a different arrangement of the cameras 16.

In this exemplary embodiment, the system 10 includes five cameras 16*a*, 16*b*, 16*c*, and 16*d* and 16*e*. The cameras 16 are grouped in camera sets 17. In this exemplary embodiment, the camera sets 17 include a first camera set 17*a* and a second camera set 17*b*. The first camera set 17*a* includes the cameras 16*a*, 16*d*, and 16*e*. The second camera set 17*b* includes the cameras 16*b* and 16*c*. The camera sets 17 are formed such that the relative 6-DOF-poses of the cameras within each camera set 17 are constant. Alternatively, only the relative 3D-positions of the cameras within a camera set may be constant so that the inclination of each camera within a camera set is individually adjustable.

The camera sets 17*a* and 17*b* can be moved translationally and/or rotationally so that the 6-DOF-poses of each camera within a camera set can be adjusted.

In this exemplary embodiment, the first camera set 17*a* is arranged at the first support element 21*a* such that the first camera set 17*a* is translationally 22*a*' and rotationally 22*b*' movable relative to the first support element 21*a*. The second camera set 17*b* is arranged at the second support element 21*b* such that the second camera set 17*b* is translationally 22*c*' and rotationally 22*d*' movable relative to the second support element 21*b*.

Figure 9:
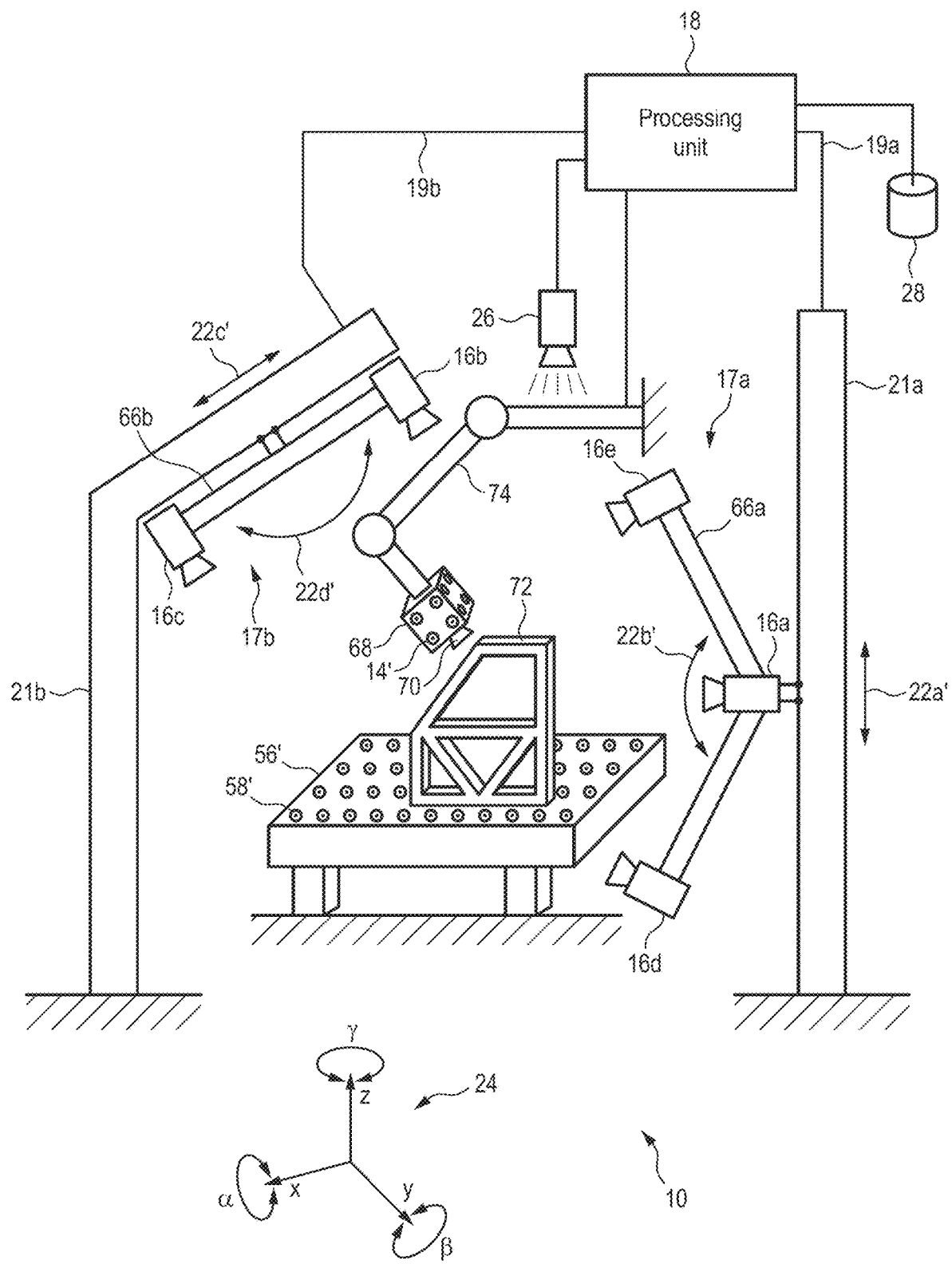
FIG. 9 shows a schematic illustration of a system implementing the method according to a fourth exemplary embodiment of the disclosure.

FIG. 9 shows a schematic illustration of a fourth exemplary embodiment of a system of FIG. 1 implementing the method shown in FIG. 3. FIG. 9 includes all specifications of the exemplary embodiments shown in FIGS. 1 to 8.

In the exemplary embodiment shown in FIG. 9, the object 12 is a measuring device 68 that includes a 3D sensor 70 for measuring a measuring object 72. A marker assembly 14' which includes a plurality of markers is attached to various sides of the measuring device 68. Typically, the determined 6-DOF-pose of the measurement device 68 is used for measuring characteristics of the measuring object 72, such as a surface or particular measuring points of the measuring object 72.

In this exemplary embodiment, the measuring device 68 is mounted on a robotic arm 74. Typically, the robotic arm 74 can be formed polyaxial. The processing unit 18 can be configured to move the robotic arm 74 so that the 6-DOF-pose of the measuring device 68 can be adjusted during a measuring process for measuring the measuring object 72.

In this exemplary embodiment, the reference object is a measuring table 56' which is disposed in the CMS. The measuring table 56' includes a plurality of reference markers 58' which are attached on top of the measuring table 56'. The measuring object 72 is disposed on the measuring table.

However, also other static objects different from the measuring table may be used as the reference object.

Typically, the processing unit 18 can be configured to change the 6-DOF-pose of the cameras 16 within the camera sets 17 according to a measuring program as exemplarily shown in FIG. 7. The measuring program can be designed such that the 6-DOF-pose of the cameras 16 are adjusted during the measuring process of the measuring device 68 so that the detectability of the markers of the marker assembly 14' is maximized at each 6-DOF-pose of the measuring device 68 in space during the measuring process.

It is understood that the foregoing description is that of the exemplary embodiments of the disclosure and that various changes and modifications may be made thereto without departing from the spirit and scope of the disclosure as defined in the appended claims.

What is claimed is:

1. A method for measuring at least one of surface characteristics or dimensional characteristics of a measuring object, the method comprising:

arranging a plurality of cameras at individual 6 degrees of freedom poses (6-DOF-poses) in the space, each of the plurality of cameras having at an individual 6-DOF pose an individual perspective into the space, individual perspectives of the plurality of cameras together defining a common measuring space (CMS), and at least one of the plurality of cameras being movable in the space;

attaching a marker assembly to a measuring device such that a spatial arrangement of the marker assembly with respect to the measuring device is fixedly set, said measuring device comprising a 3D sensor for measuring the measuring object and being moveable within the CMS;

positioning the measuring object within the CMS;

positioning the measuring device with the marker assembly fixedly set within the CMS;

adjusting the CMS with respect to the measuring device by moving the at least one of the plurality of cameras being movable in the space, thereby changing the individual perspective of the at least one of the plurality of cameras being movable in the space;

capturing at least one image of said marker assembly attached to the measuring device by the plurality of cameras;

determining spatial parameters of the marker assembly based on the at least one image, the spatial parameters representing a 6-DOF-pose of the marker assembly in the space;

determining a 6-DOF-pose of the measuring device in the space based on the spatial parameters of the marker assembly, and based on the spatial arrangement of the marker assembly fixedly set with respect to the measuring device, and determining the at least one of the surface characteristics or dimensional characteristics of the measuring object using the 3D sensor and the 6-DOF-pose of the measuring device.

2. The method of claim 1, wherein characteristics of the measuring object include the at least one of surface characteristics or dimensional characteristics at particular measuring points of the measuring object.

3. The method of claim 1, wherein the measurement device is mounted on a robotic arm.

4. A method for determining a 6 degrees of freedom pose (6-DOF-pose) of an object in a space, said 6-DOF-pose defining a three-dimensional position (3D-position) and a three-dimensional orientation (3D-orientation) of the object in the space, the method comprising:

arranging a plurality of cameras at individual 6-DOF-poses, each of the plurality of cameras having at an individual 6-DOF pose an individual perspective into the space, individual perspectives of the plurality of cameras together defining a common measuring space (CMS), and at least one of the plurality of cameras being movable;

attaching a marker assembly to the object such that a spatial arrangement of the marker assembly with respect to the object is fixedly set;

positioning the object with the marker assembly fixedly set within the CMS;

adjusting the CMS with respect to the object by moving the at least one of the plurality of cameras being movable in the space, thereby changing the individual perspective of the at least one of the plurality of cameras being movable in the space;

capturing at least one image of said marker assembly attached to the object with the at least one movable camera;

determining spatial parameters of the marker assembly based on the at least one image, the spatial parameters representing a 6-DOF-pose of the marker assembly in the space; and determining the 6-DOF-pose of the object in the space based on the spatial parameters of the marker assembly and based on the spatial arrangement of the marker assembly fixedly set with respect to the object.

5. The method of claim 4, wherein:

the marker assembly includes at least one 2D optical-tracking marker including a rotationally asymmetric pattern, and the determining of the spatial parameters includes determining a representation for the 6-DOF-pose of the at least one 2D optical-tracking marker with the rotationally asymmetric pattern.

6. The method of claim 4, wherein:

the marker assembly includes at least three 1D markers or at least three 2D optical-tracking marker including a rotationally symmetric pattern, and in the determining of the spatial parameters, the spatial parameters are a representation for 3D-positions of at least three markers in the space.

7. The method of claim 4, wherein the at least one of the plurality of cameras is moveable at least one of translationally or rotationally such that a perspective of the at least one of the plurality of cameras in the space is changeable.

8. The method of claim 4, wherein:

the plurality of cameras are mounted to a support structure, and the at least one of the plurality of cameras is movable relative to the support structure.

9. The method of claim 4, further comprising:

calibrating the at least one of the plurality of cameras after the adjusting the CMS.

10. The method of claim 9, further comprising:

positioning at least one reference object in the CMS, and wherein the calibrating further comprises determining the 6-DOF-pose of the at least one of the plurality of cameras being movable in the space with the at least one reference object.

11. The method of claim 10, at least one reference object includes at least one reference marker.

12. The method of claim 4, wherein:
the marker assembly includes one or more markers,
the space includes a movement space,
the positioning of the object includes moving the object within the movement space, and
the adjusting of the CMS further includes moving the at least one of the plurality of cameras being movable in the space such that the one or more markers of the marker assembly are detectable by the at least one of the plurality of cameras at each 6-DOF pose of the object in the movement space.

13. The method of claim 4, wherein the adjusting of the CMS further includes moving the at least one of the plurality of cameras being movable in the space such that a detectability of one or more markers of the marker assembly is maximized for the plurality of cameras.

14. The method of claim 4, wherein the adjusting of the CMS further includes moving the at least one of the plurality of cameras being movable in the space according to a measuring program.

15. The method of claim 14, wherein the measuring program includes information on a movement of the object and corresponding information on the movement of the at least one of the plurality of cameras being movable.

16. The method of claim 15, wherein:
a target 6-DOF-pose of the at least one of the plurality of cameras being movable is set with respect to a corresponding 6-DOF-pose of the object, and
the target 6-DOF-pose is a 6-DOF-pose in the space to which the at least one of the plurality of cameras is to be moved.

17. The method of claim 14, wherein:
the measuring program sets target 6-DOF-poses of the at least one of the plurality of cameras being movable with respect to the object such that detectability of one or more markers of the marker assembly is maximized, and
target 6-DOF-poses are 6-DOF-poses in the space to which the at least one of the plurality of cameras is to be moved.

18. The method of claim 4, wherein:
the plurality of cameras includes a plurality of movable cameras,
the plurality of movable cameras are grouped in camera sets of at least two cameras,
each camera set is movable, and
relative 3D-positions or relative 6-DOF-poses of the plurality of movable cameras within each camera set are constant.

19. The method of claim 4, wherein:
the capturing of a respective image includes capturing a plurality of images with at least two cameras from the plurality of cameras each providing the respective image with at least one marker attached to the object, and
the determining of the spatial parameters is based on the respective images.

20. A system for determining a 6 degrees of freedom pose (6-DOF-pose) of an object in a space, said 6-DOF-pose defining a three-dimensional position (3D-position) and a three-dimensional orientation (3D-orientation) of the object, the system comprising:
a plurality of cameras arranged at individual 6-DOF-poses in the space, each of the plurality of cameras having at an individual 6-DOF pose an individual perspective into the space, individual perspectives of the plurality of cameras together defining a common measuring space (CMS), and at least one camera from the plurality of cameras being movable;
a marker assembly configured to be attached to the object such that a spatial arrangement of the marker assembly with respect to the object is fixedly set, the object with the marker assembly attached being positionable within the CMS; and
a processing unit configured to:
adjust the CMS with respect to the object by moving the at least one of the plurality of cameras being movable in the space, thereby changing the individual perspective of the at least one of the plurality of cameras being movable in the space;
capture at least one image of said marker assembly attached to the object with the at least one movable camera;
determine spatial parameters of the marker assembly based on the at least one image, the spatial parameters representing a 6-DOF-pose of the marker assembly in the space; and
determine a 6-DOF-pose of the object in the space based on the spatial parameters of the marker assembly and based on the spatial arrangement of the marker assembly fixedly set with respect to the object.

21. A computer program product including program code stored on a non-transitory computer-readable storage medium, the program code configured to execute a method for determining a 6 degrees of freedom pose (6-DOF-pose) of an object in a space, a plurality of cameras being arranged at individual 6-DOF-poses in the space, each of the plurality of cameras having at an individual 6-DOF pose an individual perspective into the space, individual perspectives of the plurality of cameras together defining a common measuring space (CMS), at least one of the plurality of cameras being movable, the object being positioned within the CMS, and the marker assembly being attached to the object such that a spatial arrangement of the marker assembly with respect to the object is fixedly set, the method comprising:
adjusting the CMS with respect to the object by moving the at least one of the plurality of cameras being movable, thereby changing the individual perspective of the at least one of the plurality of cameras in the space;
capturing at least one image of said marker assembly attached to the object with the at least one movable camera;
determining spatial parameters of the marker assembly based on the at least one image, the spatial parameters representing a 6-DOF-pose of the marker assembly in the space; and
determining a 6-DOF-pose of the object in the space based on the spatial parameters of the marker assembly and based on the spatial arrangement of the marker assembly fixedly set with respect to the object.

* * * * *